United States Patent
Balgård et al.

(10) Patent No.: US 8,126,395 B2
(45) Date of Patent: Feb. 28, 2012

(54) WIRELESS COMMUNICATION METHOD, DEVICE AND SYSTEM FOR ESTABLISHING A CONNECTION

(75) Inventors: Lennart Balgård, Arboga (SE); Seija Tasala, Arboga (SE); Luca Raciti, Bergamo (IT)

(73) Assignee: ABB Research Ltd., Zürich (CH)

( * ) Notice: Subject to any disclaimer, the term of this patent is extended or adjusted under 35 U.S.C. 154(b) by 1232 days.

(21) Appl. No.: 11/547,866

(22) PCT Filed: Apr. 7, 2005

(86) PCT No.: PCT/SE2005/000516
§ 371 (c)(1),
(2), (4) Date: Aug. 14, 2007

(87) PCT Pub. No.: WO2005/099176
PCT Pub. Date: Oct. 20, 2005

(65) Prior Publication Data
US 2008/0139116 A1    Jun. 12, 2008

(30) Foreign Application Priority Data
Apr. 8, 2004 (SE) .................................. 0400958

(51) Int. Cl.
*H04B 7/00* (2006.01)
(52) U.S. Cl. ....... 455/41.2; 455/418; 455/420; 455/507; 455/517; 709/227; 709/228

(58) Field of Classification Search ................. 455/41.2, 455/418–420, 507–518, 67.11, 67.7; 709/227–229
See application file for complete search history.

(56) References Cited

U.S. PATENT DOCUMENTS

| | | | |
|---|---|---|---|
| 6,535,498 B1* | 3/2003 | Larsson et al. ................. 370/338 |
| 6,697,638 B1* | 2/2004 | Larsson et al. .............. 455/553.1 |
| 6,748,195 B1* | 6/2004 | Phillips ......................... 455/41.2 |
| 7,155,163 B2* | 12/2006 | Cannon et al. ................ 455/41.2 |
| 7,222,160 B2* | 5/2007 | Hlasny .......................... 709/217 |
| 2003/0036350 A1 | 2/2003 | Jonsson et al. |
| 2003/0069989 A1* | 4/2003 | Silvester ....................... 709/238 |
| 2003/0114176 A1* | 6/2003 | Phillipps ....................... 455/500 |

FOREIGN PATENT DOCUMENTS

| | | |
|---|---|---|
| EP | 1 107 512 A1 | 6/2001 |
| EP | 1 395 002 A1 | 3/2004 |
| EP | 1 450 517 A1 | 8/2004 |
| WO | WO 01/74011 A1 | 10/2001 |
| WO | WO 02/28022 A2 | 4/2002 |

* cited by examiner

Primary Examiner — Tuan A Tran
(74) Attorney, Agent, or Firm — Venable LLP; Eric J. Franklin

(57) ABSTRACT

A method for a user to establish a wireless connection between a wireless portable computing device and a wireless-equipped device in an industrial or electrical power or distribution plant. Actions of the method are carried out by a second computer program that provides information in a graphical user interface display to a user and opens a wireless connection with a selected industrial device. In other aspects a human-machine interface and a system are also described.

32 Claims, 9 Drawing Sheets

WIRELESS COMMUNICATION METHOD, DEVICE AND SYSTEM FOR ESTABLISHING A CONNECTION

CROSS-REFERENCE TO RELATED APPLICATIONS

This application claims priority to Swedish patent application 0400958-5 filed 8 Apr. 2004 and is the national phase under 35 U.S.C. §371 of PCT/SE2005/000516 filed 7 Apr. 2005.

TECHNICAL FIELD

The invention relates to a method for a wireless device to establish communication with another wireless device, and for an application, a device and a system for doing so. In particular, the invention is concerned with establishing wireless communication with devices in industrial, commercial and energy or utilities installations.

BACKGROUND ART

The use of wireless communication using short-range radio transmitter and/or receivers in industry is well established. One such standard for wireless transmission accepted for use in industry is the Bluetooth standard. To initialize radio communication between a first handheld device and a second device, in the presence of several such second devices, it is advantageous to select the desired second device with the minimum of time and effort.

A disadvantage of devices operating according to the Bluetooth standard is that a user has to know which Bluetooth service name to use in order to contact or configure the device, at least for a first time. A second disadvantage is the lengthy time necessary to establish a link to a new device even when the devices service name is known. For example, when a wireless manager application such as a Bluetooth Manager is used then the connection between devices must first be set up by the user before any interaction with the devices can be established. If a disconnection or a connection to another device is wanted then the user must open and start the Bluetooth Manager and carry out the required steps. Once the change has been completed the user can then turn his/her attention back to the maintenance, control or programming work or other task-in-hand. A first-time use of an application such as Bluetooth Manager requires many steps, perhaps as many as ten steps, to be repeated for each device that should be recognised for a first time. Subsequent contact with an already-recognised device also requires a plurality of steps or actions by a user to activate communication with the already-recognised device. In addition each recognised device is often recorded by such a wireless application manager as having more than one communication protocol, which may be organised as a number of protocols collected together in a separate profile for each detected device. It is difficult and time consuming for a user who is not specially trained in the wireless communication field to establish communication with one chosen device of many available devices in a rapid and efficient error-free way.

SUMMARY OF THE INVENTION

The invention may be summarised as a method and application for establishing a wireless connection, and a computing device, preferably handheld or portable running the application, and a system comprising the portable computing device and the application.

The invention may be practised using hardware components that are low-cost and based on existing technology. To initialize a communication using, for example, a PDA (Portable Digital Assistant) the user simply selects a first display member or button that is visible on the graphic display in order to display a list of wireless devices, and then chooses from the list a representation of the object of interest. This may be, for example a medium or low voltage circuit breaker indicated by an easily-recognisable text such as "Breaker 3", or a known or recognisable symbol for a circuit breaker, which may also be accompanied by text reading "Breaker 3" or "CB 3". The object of interest, Breaker 3 may be depicted in the same display as a plurality of other wireless-equipped devices in the vicinity of the user and/or Breaker 3.

The basic idea of the invented method is to present a very user friendly HMI to the operator. This is done to a great extent by hiding from the user everything that explicitly relates to the wireless technology. The invented method comprises an application running for the most part in the background that handles all actions needed for the wireless connections. The application handles making a connection and the operator can concentrate fully on a computer application in the foreground, which may be an application for control, monitoring, data logging, troubleshooting or other routine or normal tasks. The operator knows that interacting with any wireless device in the vicinity is always possible, without having to consider that it is done using a wireless connection, or how to make a wireless connection.

The invention can be implemented in several ways. Preferably a graphic object, which can be a text, text window, a symbol, a button, a menu or a similar item, is displayed for the user, always visible or, altenatively whenever relevant, on top of or beside the GUI of the foreground application. The user can click, tap or otherwise select this graphic object to view a list of alternative devices that can be selected. The alternative devices are made available by the background application for the user to interact or communicate with. When the user has made a selection from the list, the list can disappear from the screen, or the list can still be open to allow multiple selections. Supplementary alternatives in the list can be to update the list, to work off-line with no device selected, to select device from a database, to select from a list of the most recently selected device or other relevant alternatives. In another implementation a list of alternatives may be shown automatically every time the foreground application, hereafter referred to as a first application, needs the user to make a device selection.

The list of devices may contain any representation of the objects of interest for example a name, a symbol, an icon, a number, or combination thereof.

To further improve the user friendliness and breadth of application the invention further comprises the use of one or more filters before displaying a list of available devices. Only those devices that are accepted by the filters are then shown to the user as available devices. A first filter may compare the identities of the wireless devices that are found by the background software application with a stored list of devices that are a selected part of the system or plant. A second filter may compare with a stored list of the devices that the user is authorized to work with. A third filter may compare with a stored list of the devices that need a software update or that require configuration.

The principal advantage of the invention is that communication between a first device and a selected second device of a plurality of such second devices, each equipped with a short range wireless communication means, may be established in a very short period of time. Another advantage of the invention is that selection of one particular device of many in a given location, each equipped with wireless communication means, may be established quickly and with certainty. It is a further advantage that this is carried out by a user with the minimum of necessary actions. A user with a portable computer such as a PDA may run any computer application for a purpose such as maintenance, control, data logging etc. and, without breaking off or otherwise apparently leaving the current application, the user simply selects the button or other graphic object in the GUI of the PDA to display a list of user friendly names for all recognised devices in the vicinity. The user then selects the desired device to communicate with, and after those two actions then resumes work using the computerised application of interest still running on the PDA.

It is also an advantage in a large industrial installation or commercial building, port, airport or hospital with perhaps hundreds of control devices that the operator does not need to know the object or service name, system name or control name, communication protocol etc. of the desired or target wireless device.

Another further advantage is that the speed of establishment of connection makes it feasible for a technician or operator to establish communication almost instantly with each of many different devices in turn all located in the same general surroundings, such as a part of a factory, a floor of a warehouse, an area inside an airport building, a substation in a part of an oil refinery, a part of a process or production line, breakers or protection equipment in a yard of a power distribution yard, and so on. This is a great benefit that enables any authorised person with a wireless equipped portable computer, PDA, notebook, combined mobile phone-PDA-camera and so on, to make contact with a specific wireless-equipped industrial component as desired: and then examine a status or an alarm, a configuration or any other live or stored data associated with that component. This may be done routinely by a user, an operator or technician during normal operational or production circumstances.

Similarly any authorised user, including an operator, technician, engineer etc. with a wireless equipped computer, phone, etc., can make rapid and secure contact with a chosen wireless-equipped component during maintenance, troubleshooting, repairs, service work or changes in type of product or production. Contact with any chosen wireless equipped devices is simplified and greatly speeded-up, thus simplifying and speeding up the monitoring, information retrieval from, and/or control of such wireless equipped devices in any industrial environment. The invention thus reduces down time, service time, configuration and/or set-up time during changeovers required to suit changes in type of product made or changes in production output quality or amount.

In an advantageous embodiment, the background application hereafter referred to as the second application, displays the list of user-friendly names automatically when the first computer program requires communication with a device so as to retrieve or write data, or to contact the device for some other reason. In this embodiment, the second application detects that the first computer program application has requested such a service, method or device, and automatically displays the list of known devices to the user, displayed on top of the first computer program application.

It is also an advantage that the method, application, device and system according to the invention may be used with any device already installed that operates according to a known and established communication protocol or standard for short-range wireless communications.

BRIEF DESCRIPTION OF THE DRAWINGS

Embodiments of the invention will now be described, by way of example only, with particular reference to the accompanying drawings in which.

DETAILED DESCRIPTION OF THE EMBODIMENTS

The industrial device is typically a production or maintenance equipment in the broadest sense of the word in an industrial or commercial installation. This includes, for example electrical power generation and/or transmission and/or distribution installation equipment such as generators, circuit breakers, transformers, protection devices, isolators and so on; in an industrial installation such as a rolling mill the devices may be casters, mill stands, shears, measuring rolls, coilers, furnaces; in a paper mill may be pulp grinders, pulp treatment tanks, paper machines, dryers and so on; in an oil and gas extraction or treatment installation valves, pumps, risers, compressors.

Figure 1:
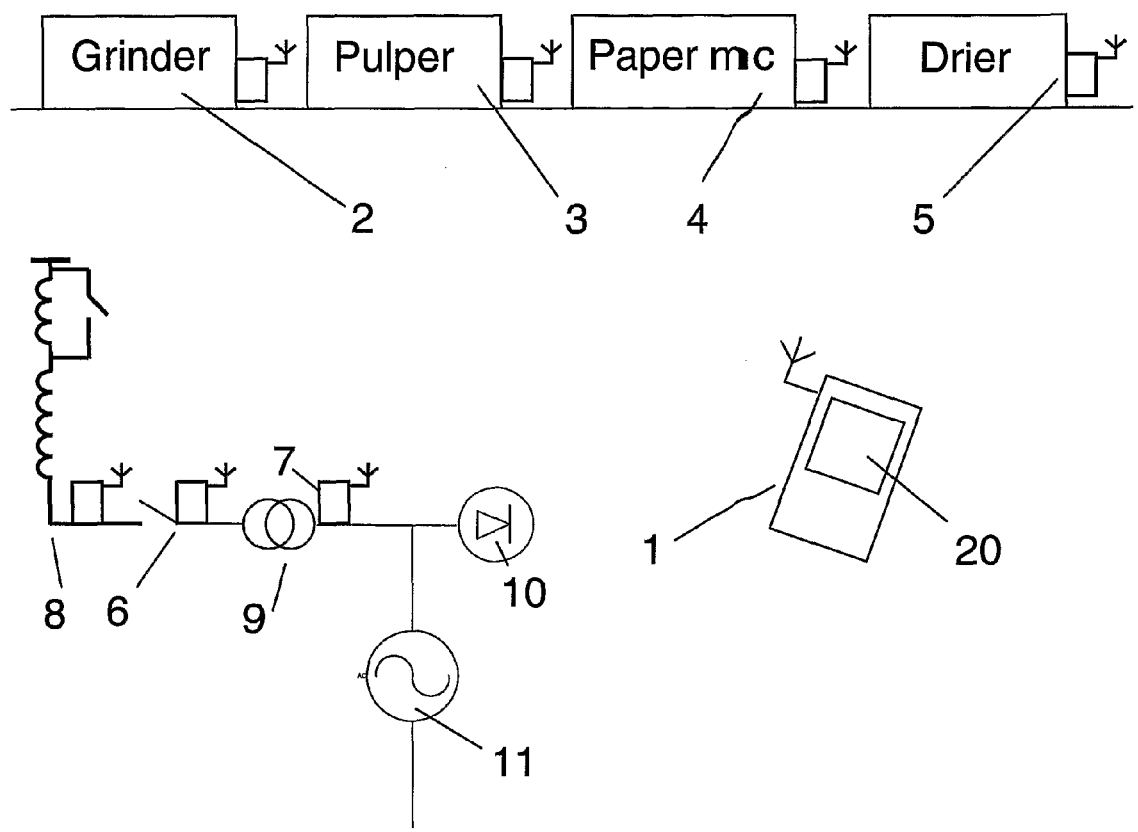
FIG. 1 is a schematic diagram of a wireless-equipped portable computing device and a plurality of wireless-equipped devices in an industrial and/or electrical power generation/distribution/transmission location according an embodiment of the invention.

FIG. 1 shows schematically a diagram of a wireless-equipped portable computing device in the vicinity of a plurality of wireless-equipped devices in an industrial location according to a first embodiment of the invention.

The figure shows separate production equipment in an industrial process, a grinder 2, pulper 3, paper machine 4, drier 5 each equipped with sensor of some kind with wireless functionality. The figure also shows electrical distribution and power equipment variable transformer 8, breaker 6, transformer 9, rectifier substation 10 and AC generator or backup AC generator 11, similarly equipped with typically one or more sensors, and at least a data I/O interface and with wireless functionality. Also shown is a portable computing device 1 such as a PDA, with wireless functionality and an interface 20, preferably a graphical user display.

A user operating a wireless enabled PDA or other portable computing device 1 may use it to establish a wireless connection between the portable computing device and one selected (wireless equipped) industrial device 2-11 at a time, from a plurality of wireless equipped devices in the vicinity of the user. A user with the PDA carries out a task of some kind, typically while walking round in an industrial installation, typically using a first computer program application running on the PDA. This computer program application may be a text or word processing program, a maintenance program, a program displaying drawings, a data logger, a configuration program, in short, any computer program that a user may use to carry out a part of his or her job. A job such as an operator, technician or engineer in order to operate, monitor, configure, access data for or about the device, log data and so on or to control the industrial device.

Figure 2A:
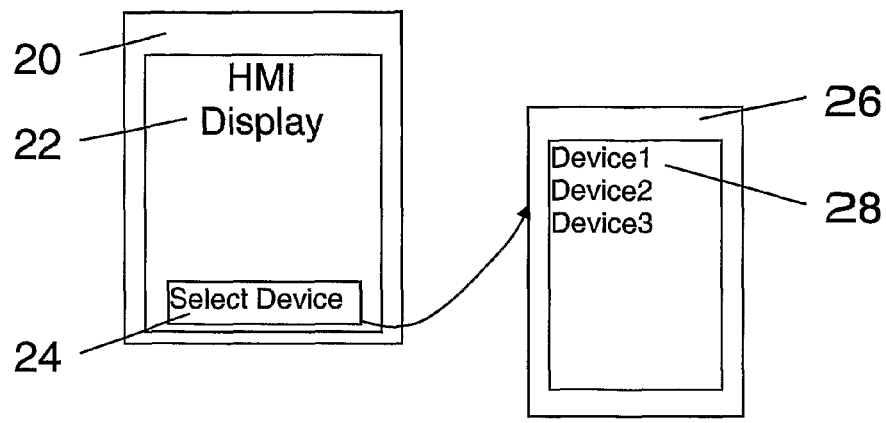
FIG. 2a is a schematic diagram of an HMI (Human-machine interface) according to another aspect of the invention.

FIG. 2a shows an HMI (Human-machine interface) with a GUI (graphical user interface) display for use with such a PDA or other portable computing device. The HMI provides a graphic object, button, icon or other visible symbol that a user may select, tap or in any other way activate in order to display a list of said first devices available for wireless communication, such as those devices 2-11 shown in FIG. 1. The figure shows a GUI display 20, with an HMI 22, which includes a display member 24, a button or other such graphic object. When the display member 24 is activated by a user, it presents a list 26 containing one or more devices represented by user-friendly names 28 or symbols. These may be text names such as Breaker nr 1, or Pulper 2, Riser 15, Flatness Roll 2, Paint booth 7, backup generator 2 and so on. Alternatively graphic symbols may be used to represent the devices in a pictorial way as equipment in an intuitive way, with for example icon-like representations of a valve or a mixer or a circuit breaker. A combination of symbols and text or numbers may be used to identify different devices of the same functional type. To establish contact with a selected device, the user taps or touches the user-friendly name or icon displayed, and a wireless connection to the selected device of devices such as 2-11 is then established, in the background.

Figure 2B:
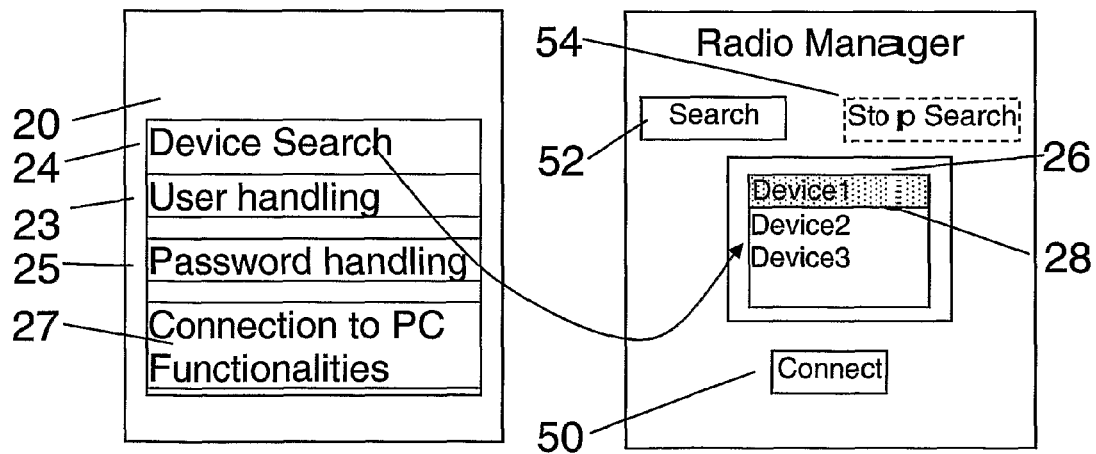
FIG. 2b is a schematic diagram of an HMI according to another aspect of the invention.

FIG. 2b shows another implementation. A different graphic display member, includes at least a display member 24 which opens, upon activation, to provide a list 26 or window containing one or more devices named with intuitive, human-readable names. In this case a device such as Device 1 may be selected by activating a separate graphic member, the screen button marked Connect, 50, as an alternative way to the method of 2a in order to "select" the desired device name. The figure also shows that the GUI 20 may also include functions other than selection of a device by name. It may for example provide immediate access from the same graphic member 20 to User handling 23, Password handling 25, or connections to PC functionalities 27. Preferably the graphic display member 24 is activated by tapping the screen, touching the screen, activating or otherwise "clicking" on an on-screen pointing device or graphic input device such as a computer mouse or similar.

Figure 3:
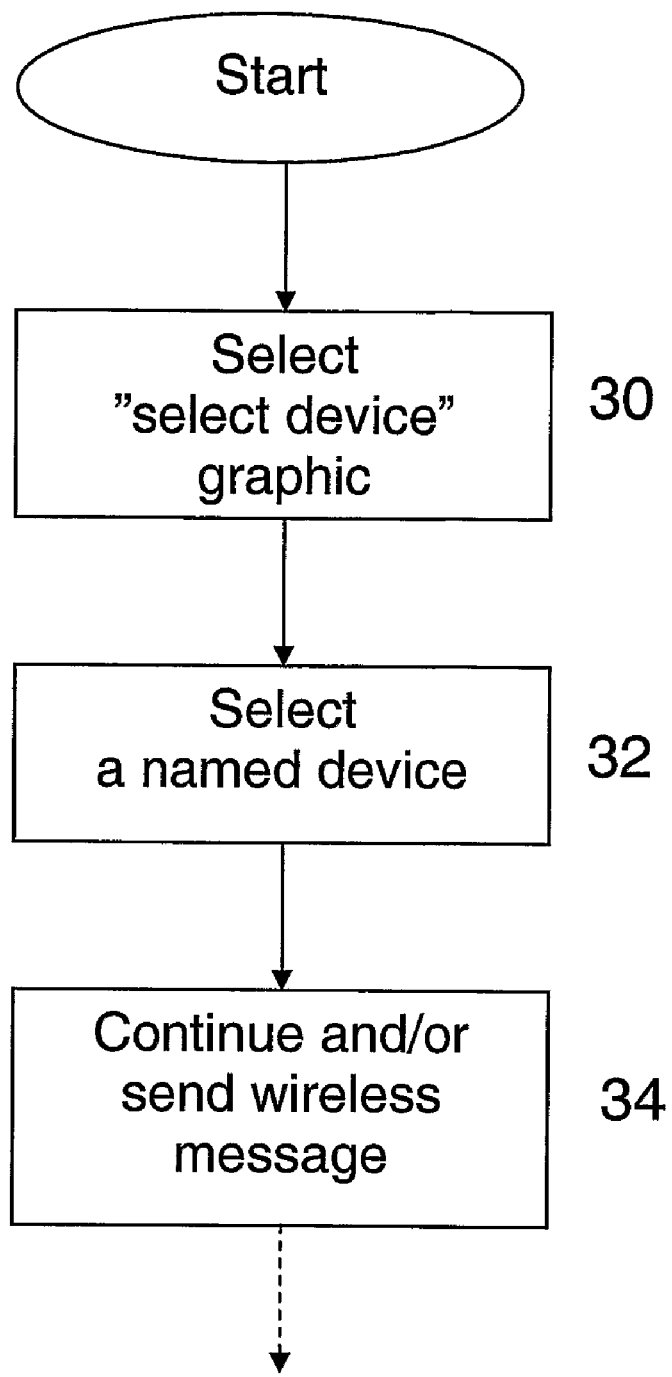
FIG. 3 is a flowchart for a method for establishing communication between the portable computing device and one of a plurality of wireless-equipped devices according an embodiment of the invention.

FIG. 3 shows a flowchart of a method according to the invention. While the user is running the first computer program on the PDA or other portable computing device the user wishing to make contact with a chosen device in the location does the following. At action 30 the user activates a button or other image displayed on an HMI of the PDA (24 of FIG. 2) in order to select a device to communicate with. At action 32 the user selects one of one or more devices that are represented by a user-friendly name or symbol in the list (26 of FIGS. 2a, 2b). The user then returns immediately to the task in hand, at action 34, so that communication could be established between the device and the first computer program application, which most likely includes operating the first computer program to send a message to the device that the user has just selected. The second application running on the PDA normally, but not exclusively, displays a button or other graphic item on top of any other program. If a user wishes to contact a device, the user carries out actions 30-34.

The second application may run in the background all the time the PDA is switched on. The application, or a part of it, may be resident in processor memory or RAM memory at all times. The second application may run and be configured to be visible in the foreground even if the PDA only has an operating system running, for example for working, editing, configuring passwords etc. off-line.

An instance of the user-friendly names 28 or symbols are also comprised in a table or other data structure which is used by the second application to retrieve a unique radio address that belongs to each of the devices listed with user-friendly names. When a user selects one of the user-friendly names 28, the display member 26 disappears, and the user returns to whatever display is provided by the first computer application running on the PDA, and continues working.

The list of devices with user-friendly names may be created for a first time. A device name list containing user-friendly names matched to their unique radio addresses may then be downloaded to the or each PDA or other portable computing device. This device name list may be downloaded wirelessly, eg from a LAN or WLAN, or downloaded from a database or a list, table, or other data structure held in a memory via a data network such as an industrial LAN or even from the Internet over a secure connection. The device name list may alternatively be retrieved from a removable memory storage device connected to or plugged into a data port or memory module input of the PDA. This also enables a user such as a maintenance engineer who wishes to use the same portable computing device in different plants to easily access equipment located in different installations by using a plug-in memory module loaded with a device name list specific to a given installation. Behind the scenes and not visible to the user, the second application running on the PDA looks up an address function to find a preconfigured radio address for the device of interest. Depending on the communication or wireless protocol used and other requirements, the radio address may be globally unique, unique to a country or a plant or to some other grouping. The application then sends a radio message to the device of interest, using the unique device address and establishes radio communication with the wireless unit of the device.

In this intuitive way a user may make contact with an industrial device of interest by selecting first a button, icon or other visible marker that is displayed on top of another other program; and then secondly by selecting a user-friendly name. The second application then opens a wireless connection with the desired device. By means of the method and application the user may continue to use another program or the first computer program application, which sends and receives messages to and from the device, without the user being required to know the service name or the radio address of the device, the preferred communication protocol or how to establish communication with one particular wireless equipped device in an area that may contain many such devices. These functions are handled by the second application according to the invention.

Figure 4:
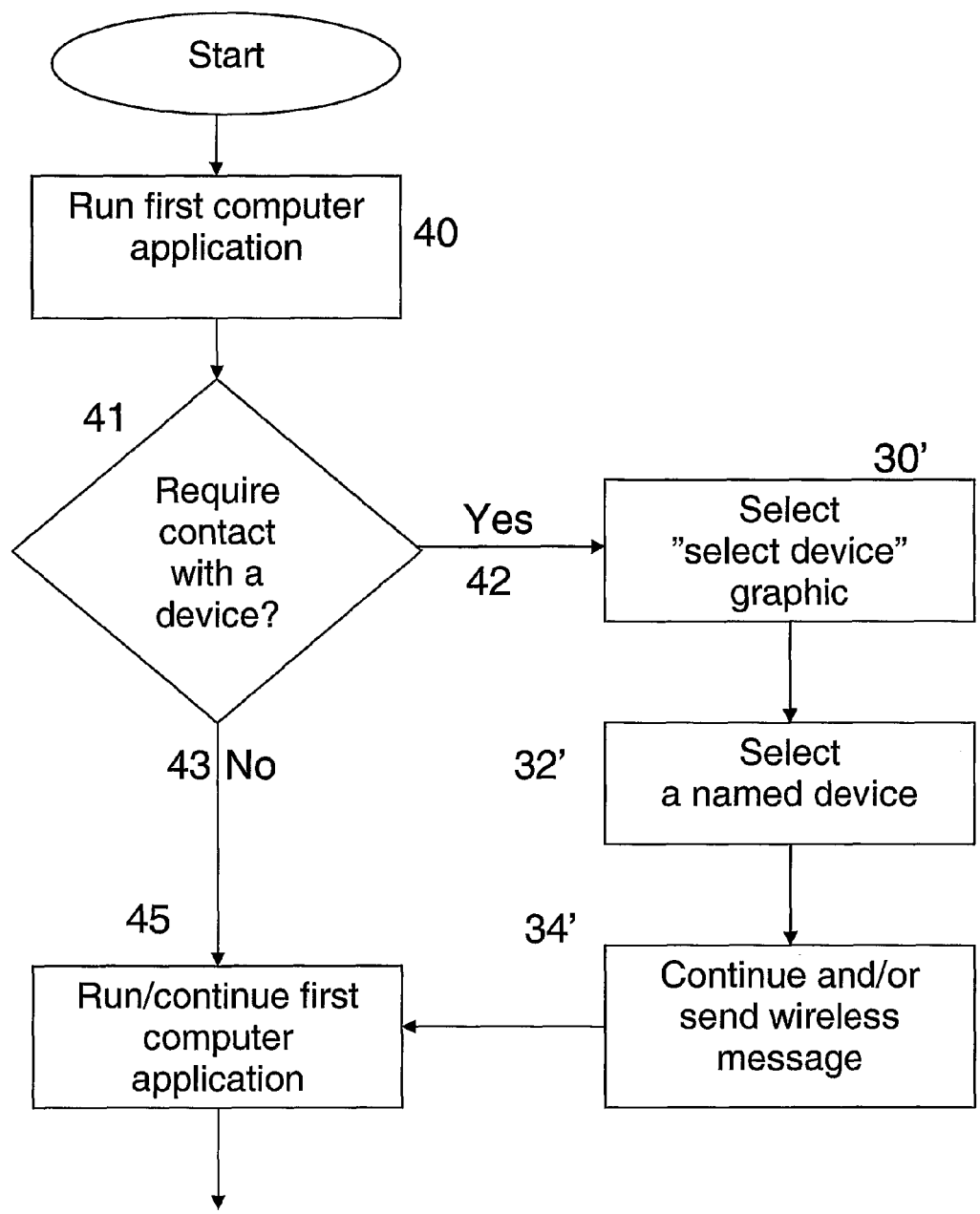
FIG. 4 is a flowchart for a method for establishing communication between the portable computing device and one of a plurality of wireless-equipped devices according another embodiment of the invention.

FIG. 4 shows in flowchart form how the second application of the invention may run from time to time as required by the user while another first computer program application runs more or less continuously. It shows a first computer application being started 40, and at some point, a decision 41 is made by the user to make contact 42 with a device. This leads to the actions previously described in relation to FIG. 2, ie to actions 30'-34'. The first application continues to run 45 or be operated by the user.

Figure 5:
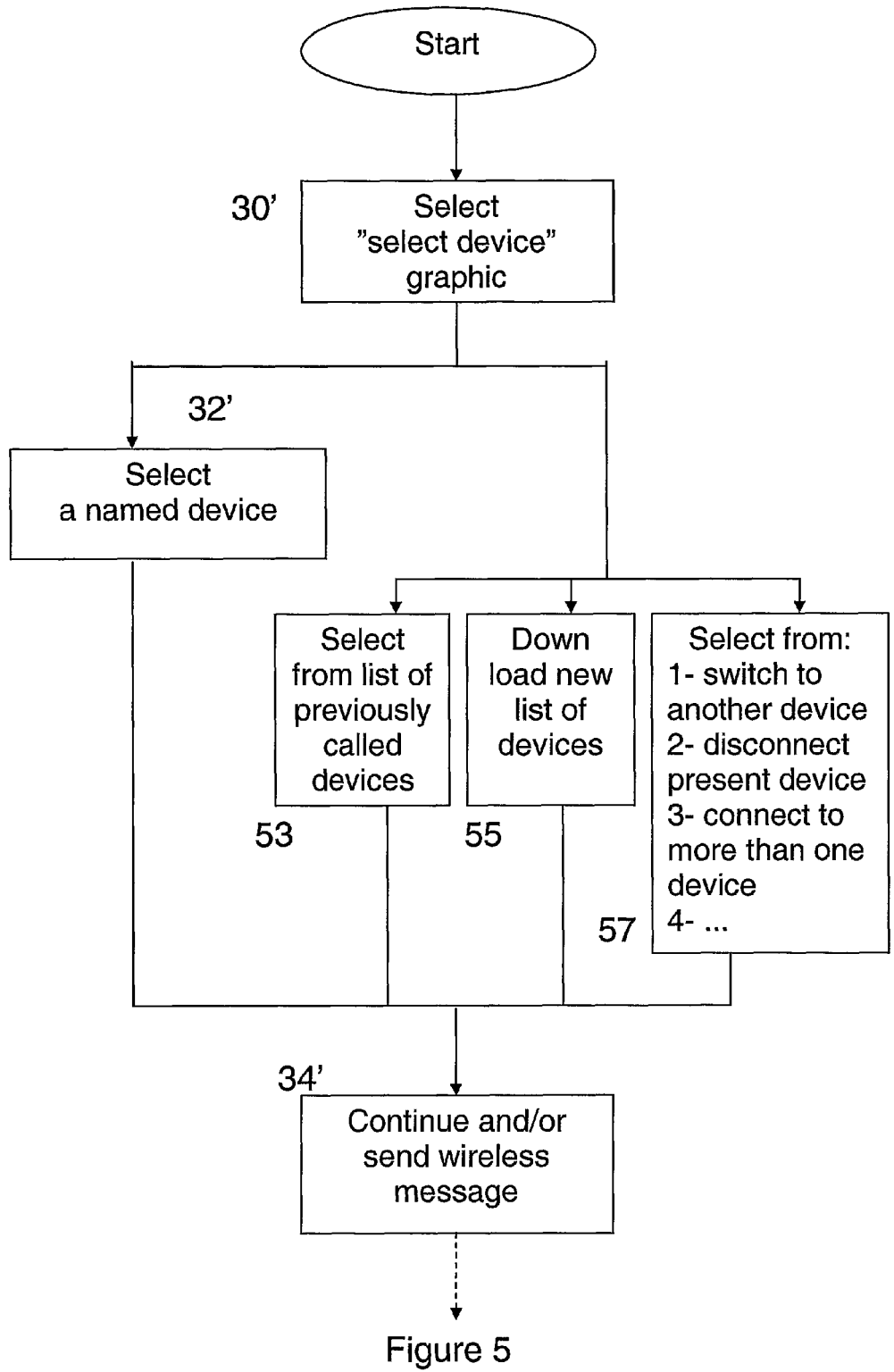
FIG. 5 is a flowchart for a method for establishing communication between the portable computing device and a wireless-equipped device according to further embodiment of the invention.

FIG. 5 shows in a flowchart another embodiment of the invention. The figure shows that selecting the "select device" graphic may lead to a series of choices. The user may select a named device 32 or instead select:

from a list of previously contacted devices 53;
to download a new list of devices 55;
to switch from the present device to another device 57, disconnect a device presently connected to, connect to more than one device,
other options, such as carry out a wireless scan for devices in range and switched on, for a new or previously unrecognised device, edit/change existing device names, remove an existing named device from a list, and so on.

Figure 6:
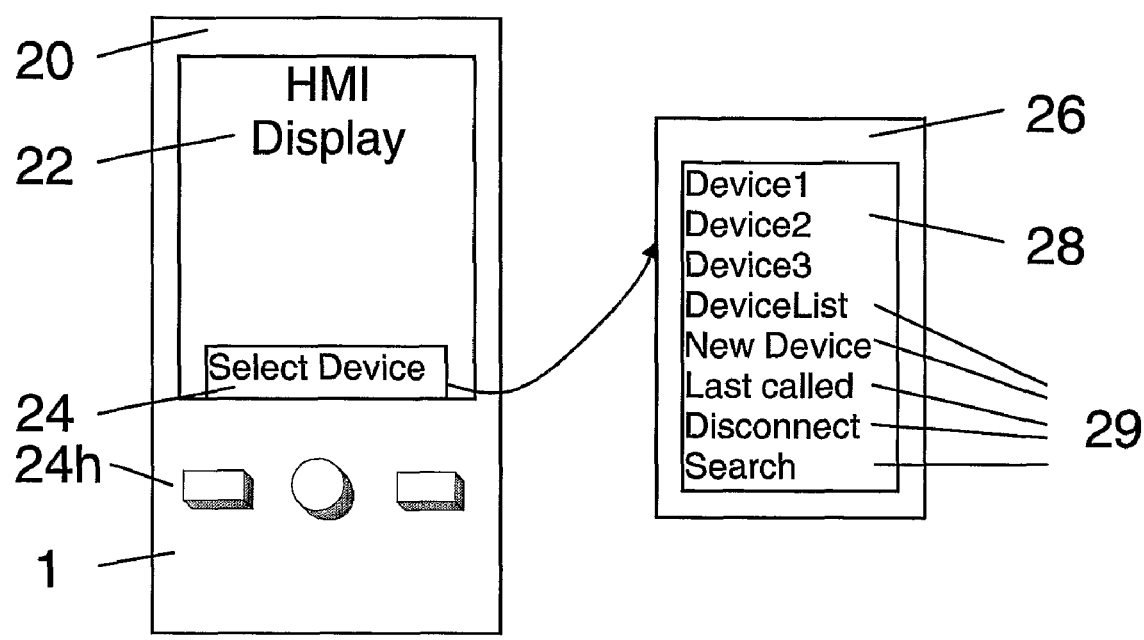
FIG. 6 is a schematic diagram of an HMI (Human-machine interface) comprising additional communication options according to another aspect of the invention.

FIG. 6 shows schematically an HMI according to this embodiment. It shows the same GUI 20 and HMI 22 with the same graphic device 24. It also shows that the list 26 displayed by the user on activating the "select device" button 24 contains additional options 29 as well as a list of one or more devices 28 with a user friendly name. Thus additional options 29 may comprise:

Device list, select an additional or alternative list of devices;
New device, add a new and identified device;
Last called, select from a list of the last n most recently contacted devices;

Disconnect, disconnect communication with a present device; Search, conduct a wireless scan for any device in the location, within wireless range, and switched on. The portable computing device 1 of FIG. 6 is shown with one or more buttons or keys 24h that physical button or keys, and not graphic objects on a display. Instead of activating a graphic display, a GUI only, as described in connection with FIG. 2a onward, a user may instead use a real or physical button to carry out a step of the method. One or more buttons or keys or thumbwheels etc may be dedicated to providing one (or more) steps of the method of the invention; or in some other way configured so that one or more steps of the method are carried out. For example, pressing a button such as 24h when suitably configured may cause the device list 26 to be displayed on the screen.

FIG. 2b also shows elements of this embodiment. It shows a button or other graphic element 52 here labeled "Search" that activates a search for other wireless devices in the vicinity. On the first display member of the embodiment of FIG. 2b it also shows that configuration-type tasks of password handling or user handling may be carried out by the second application. Alternatively a physical button such as 24h or similar may be dedicated or configured to activate a Search for devices upon being pressed.

Conveniently the user can communicate with an industrial device in order to access or retrieve data, check set points, adjust set points etc intuitively and with a minimum of actions by means of the method and second application of the invention.

The second application of the present invention may be implemented in a number of different ways according to the scale and type of system used. The second application may for example be implemented as any from the list of: computer program executing on the PDA or other portable computing device; a computer program that operates in the background; a plug-in program; a computer program client application or thin client that executes locally on the portable computing device in cooperation with a server process on another computing machine; an application embedded in a hardware component of the portable computing device. Preferably the second application is implemented as to minimise the processor memory and/or ram memory and related resources required to run this function in the PDA. The invention may also be implemented as a web browser program.

In a development of the invention, the second application may be configured to respond to radio signals transmitted by devices announcing their presence or inquiring after a connection. In this case the second application is configured to respond to a detection or report by the wireless hardware of a wireless inquiry signal and displaying the list 26 of said first devices on the display 20 of the PDA shown in FIGS. 2a, 2b.

Figure 8:
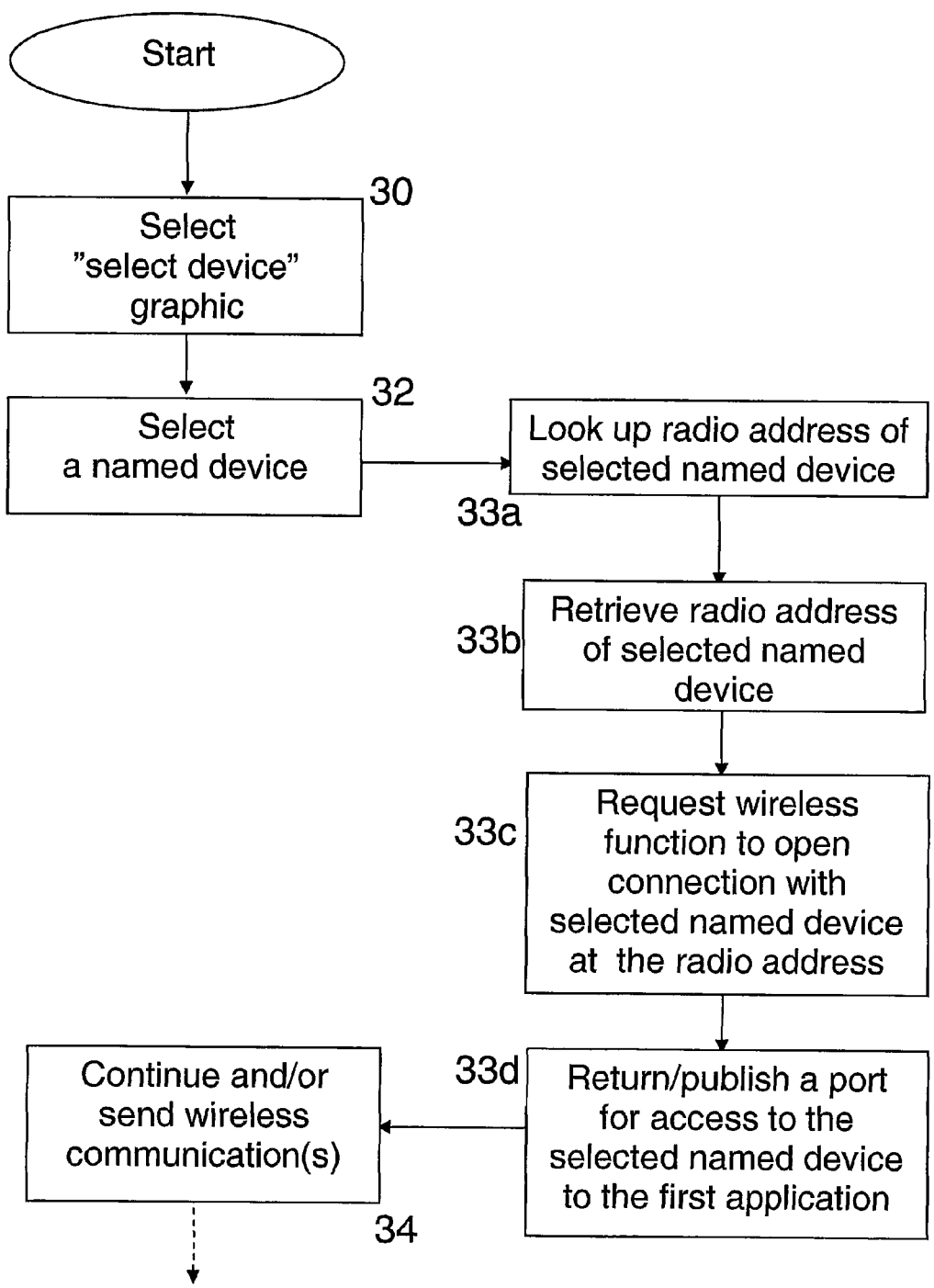
FIG. 8 is a flowchart for a method for establishing a wireless connection between a first computer program running on a portable computing device and one of a plurality of wireless-equipped devices according an embodiment of the invention.

FIG. 8 shows in more detail than those described in relation to FIG. 3 a flowchart of an example of how the second application may establish a wireless connection to a desired wireless device. The figure shows that when a device with a user friendly name is selected 32 by a user, the second application retrieves a wireless address or unique wireless address for that device, such as a Bluetooth address. This may take place with the following actions:

look up a radio address for the selected named device 33a,
retrieve the wireless address corresponding to the selected named device 33b,
request the wireless hardware to open a connection with the selected named device at the retrieved wireless address 33c,
return or publish a port number or other channel identifier to the first application 33d;
send messages or retrieve data wirelessly 34 between the first application and the selected named device.

After the list 26 of said first devices provided by the second application has been accessed, the list will be removed following a configurable time delay after a request for access to a first said device.

Figure 7A:
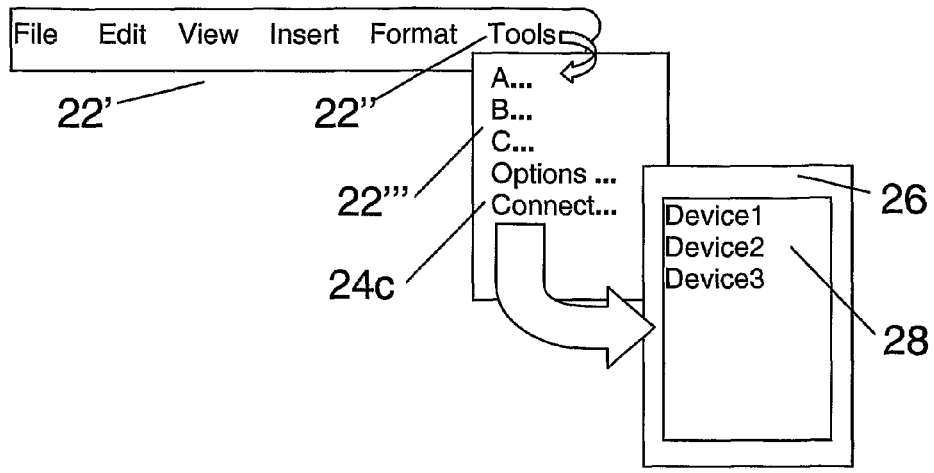
FIG. 7a is a schematic diagram of an HMI (Human-machine interface) according to another embodiment of the invention.

FIG. 7a shows in another embodiment of the invention, that the second application may be implemented so that the list of user-friendly names for devices is presented or otherwise displayed by the first computer program, and typically on request by the user or a process of the first computer program application. Thus the devices with user-friendly names according to a device name list held by the second application are made available to a user of the first program in a similar way to that with which a user may, for example, select a printer under a print function of a program. That is, instead of selecting a standalone, local or distant network printer, the user selects which device the first program shall make contact with by selecting a user-friendly name. This may conveniently be accomplished by the second application calling one or more known or published API (Application Programming Interfaces) of the first computer program application so as to "integrate" or run as a "plug-in" into a display means of the first application to display the user friendly device name.

Figure 7B:
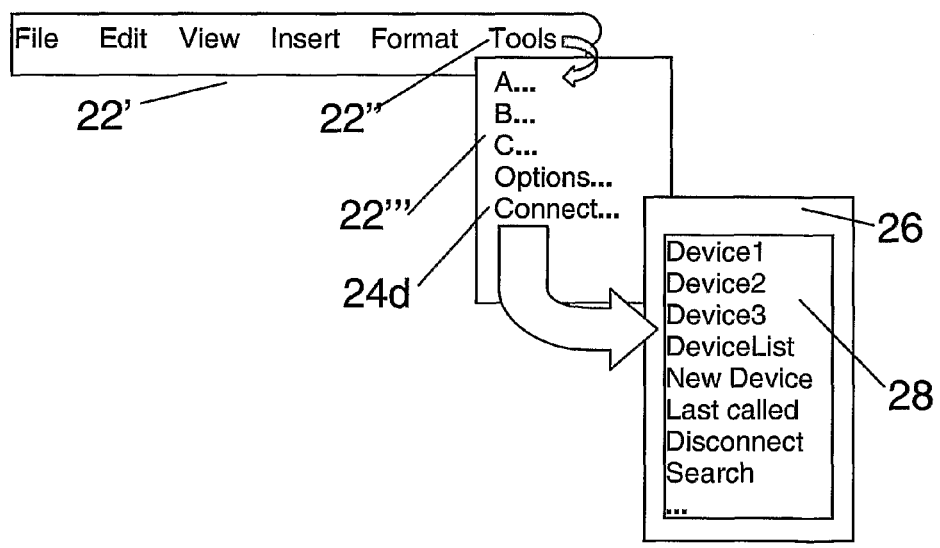
FIG. 7b is a schematic diagram according to another aspect of the embodiment of the invention.

FIG. 7a shows an exemplary HMI of a first computer program. The figure shows a typical graphic interface item, a menu bar 22 with a number of drop-down menus available under various headings commonly used in computer programs, such as File, Edit, View etc. Menu bar option Tools 22" may, for example, comprise a plurality of functions 22'" that may be selected by the user of the first computer program. In this example the functions of the invention are activated by a selection under the Tools 22" menu of the first or other computer program application. The invention as shown here may be implemented as a plug-in or other accessory or background application which appears more or less seamlessly among the screen controls of the first computer program, as a graphic element 24c. The graphic element, in this case a menu option, may be selected so as to activate a list of wireless devices with user-friendly names, as described above in relation to FIG. 2a. FIG. 7b shows the same type of seamless inclusion of the invention into a first computer program for another embodiment of the invention described in relation to FIG. 2b.

Figure 9:
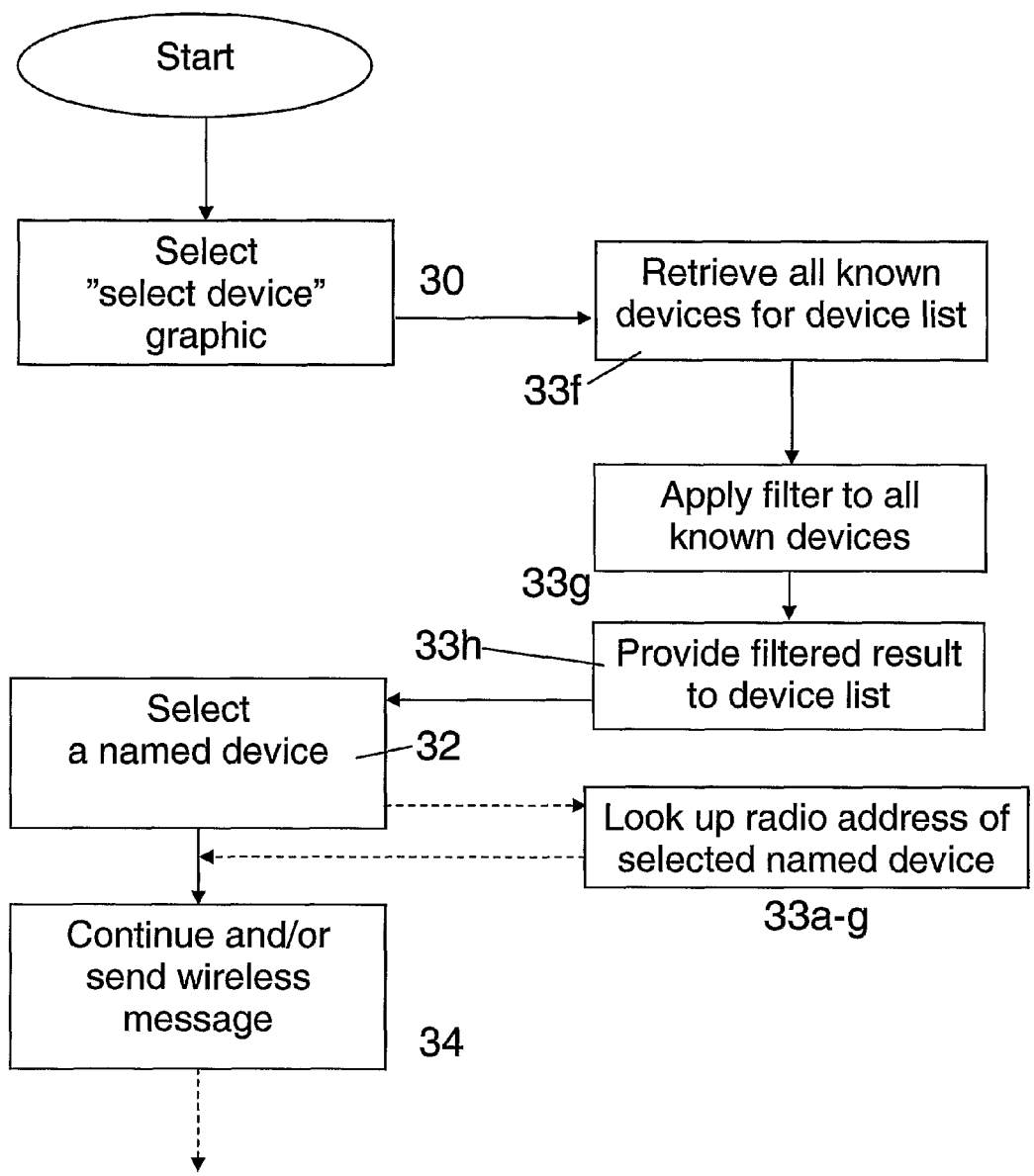
FIG. 9 is a flowchart for a method for establishing a wireless connection for communication between a first computer program running on a portable computing device and one of a plurality of wireless-equipped devices according a further embodiment of the invention.

In a further embodiment the device list presented to the user may be filtered. FIG. 9 shows a method similar to the method described in relation to FIG. 3 but with the addition of a filtering function. The figure shows actions including a filtering function, which begin with the action of FIG. 3 when the graphic object 28 of FIGS. 2a-b, 7a-b, is activated by the user to select a device 30, a filter process begins which is not normally visible to the user. All known devices are retrieved 33f and a filter applied to the list 33g to arrive at a filtered selection of all known devices which is presented for the user to select 32 one of the devices, as shown, with a user friendly name or symbol. A wireless connection to that device is then established in the background by the second application, as described before in relation to FIGS. 3-5, 8, and also indicated in FIG. 9 by steps 33a-g, such that the first application may then communicate 34 with the device so selected, as previously described above.

The filter may be carried out in a number of ways according to a variety of requirements or conditions. For example, a user logged on as an electrician may see a filtered list of equipment such as devices 6-11 of FIG. 1, further filtered by which physical location in the plant that the electrician is standing. Similarly a process operator may be presented with a device list filtered according to production devices such as 2-5 FIG. 1, alternatively further filtered according to user location in the plant, or process area. A maintenance person may have access to an unfiltered list of all devices and also alternately access to a filtered list of devices for which there are open maintenance orders, or a device condition such as: currently not operating, high/low value, open alarms, and so on.

Location of the user in the plant or in a process section of an installation may be known to, eg detected by, the portable computing device 20, and/or by a control system in the plant. Devices may be filtered with respect to where in the plant or plant process the user is presently located. Devices may also or alternatively be filtered according to job, so that an electrician may see devices 6-9 of FIG. 1 whereas an operator or process technician may only see devices in a process 2-5. A user also has certain authorities and privileges which may also be included in a filter to optimise a selection of devices that a given user may access depending, for example, on location, job and/or user authorities.

In a further advantageous embodiment, the list of user-friendly names is automatically displayed only when it detects that the first application requires a communication channel to a device. This is carried out by the second application running in the background, so as to speak. Upon detection by the second application, or by a watchdog function or by an agent functioning together with the second application that the first computer program requires communication with a device, the second application executes to provide instructions to cause the PDA (or other portable computing device) to display the list of user friendly device names or symbols on top of the first application, similar to that described in relation to FIGS. 2a, 2b and 6. In a development of the embodiment, this embodiment causes the first application to display the list by, for example automatically opening a menu option such as that described in relation to FIGS. 7a, 7b. Thus a user is prompted to select a device from a list of user-friendly device names or symbols that the first application shall communicate with by a wireless connection. Once again, the wireless connection is established in the background by the second application, and the user does not need to be aware of how it is done.

Optionally a user may also issue a command to cause the second application to display a list of user-friendly names or wireless devices; or to display selection means to activate any other functions of the second application. This may be in order to contact a device as described previously, or may as well be in order to add devices, search for devices, or read, edit or in some way configure or re-configure the information about named devices handled and/or presented by the second application, or password access to them for one or more users.

Optionally a dedicated physical control or button 24h, of the portable computing device 1 FIG. 6, may be used to carry out one or more actions of the method of the invention. A button may be dedicated or configured so that pressing the button causes an action such as:

display devices available for connection,
open a connection to a device,
start a device search, and so on as described above in relation to the different embodiments.

The invention has been described above in terms of two computer programs, a first application used for carrying out work-related tasks in an industrial plant or distribution yard and a second application for establishing a wireless connection in the background, for the most part with most functions not visible to a user. However, the invention may also be practised in a combined form in which the second and first applications are combined in a single software or computer program. In this way the establishment of a wireless connection is carried out in the background by a part of the same application or software or computer program that may be used to carry out the work-related task.

The invention establishes a wireless connection between a portable computing device and a device for production or associated operations in an industrial installation, or an installation for transmission or distribution of energy or electricity, suitably equipped for wireless communication. Examples of such devices have been described above, such as production or operational devices comprised in production process equipment for pulp and paper, and for breakers, transformers, switches and so on in transmission or distribution installations. Devices may also consist of one or more sensors in a process or production plant or power transmission/distribution installations. Thus, the device may for example be a pressure and/or temperature sensor on a fluid line in a pulp or paper mill, steel mill, steel converter plant, rolling mill, or in a fluid tank of a transformer, protection device, tap-changer, fluid-filled power cable or cable joint and so on in a power distribution installation. The device may consist of one or more sensors of any type, responding to changes in properties of any of the list of: mechanical, electrical/magnetic inductive, electrical/magnetic resistive, electromagnetic radiation. Thus a such device may be thermal or optical, such as an IR sensor, or responsive changes in mechanical forces by means of a magnetoresistive or magneto-elastic pressure sensor, and so on.

Although the invention has in this specification been described in relation to the Bluetooth standard, or compatible with any standard issued by the Bluetooth Special Interest Group (SIG), it may also be implemented using any other suitable wireless communications protocol. A protocol compatible with, for example any variation of IEEE-802.11, WiFi, WiMax, Ultra Wide Band (UWB), ZigBee or IEEE-802.15.4, IEEE-802.13 or equivalent or similar. This is also to be understood to have an influence on what type of radio address or radio identity is used by the second application to open a connection with a radio unit of a device. With a Bluetooth system a globally unique radio address may be used; however dependent on wireless protocol used and requirements in the installation a radio identity may be a radio address unique to that local plant, or another type of radio identity that is locally unique. A standard compatible with WAPI (WLAN Authentication and Privacy Infrastructure, GB15629.11-2003 or later) may advantageously be used in situations where encryption of the wireless signal for authentification and so on, such as by methods incorporating elliptical curve encryption algorithms, is necessary and/or advantageous.

In some industrial situations a radio technology working at high frequencies usually greater than 400 MHz, for example in an ISM band, with significant interference suppression means by spread spectrum technology, may be the preferred type of wireless communication. For example a broad spectrum wireless protocol in which each or any data packet may be re-sent at other frequencies of a broad spectrum at around 7 times per millisecond may, for example, be used such as in a protocol developed by ABB called Wireless interface for sensors and actuators (Wisa).

It should be noted that while the above describes exemplifying embodiments of the invention, there are several variations and modifications which may be made to the disclosed solution without departing from the scope of the present invention as defined in the appended claims.

The invention claimed is:

1. A method to establish a wireless connection between a portable computing device with at least one first computer program application and a first device equipped with a member for radio communication, wherein the first device is a device for production or associated operations in an industrial installation, or an installation for transmission or distribution of energy or electricity, the method comprising:
displaying a user-friendly name for a first said device dependent on identity information in a list of said first devices in a graphic display member on a GUI display of a said portable computing device,
receiving a signal for selection of said first device from the list of said first devices,
activating the user-friendly name or symbol of said first device so as to cause a second computer program application to call a method or service of said first computer program application in order to provide the method or service of the first computer program application or publish a port, or other access channel, for the established wireless connection;
returning or publishing a port number or other channel identifier to the first computer program application;
causing the radio communication member of the portable computing device to generate a wireless signal to establish a wireless connection with the selected first device; and
sending messages or retrieve data wirelessly between the first computer program application and the selected first device.

2. The method according to claim 1, further comprising:
causing the radio communication member of the portable computing device to generate a wireless signal to or a wireless search to determine which of any said first devices are operating within wireless range of said portable computing device.

3. The method according to claim 1, further comprising:
activating the graphic display member displayed by the HMI by use of an GUI input member so as to select the said first device from the list of available said first devices.

4. The method according to claim 1, further comprising:
displaying a list of said first devices in which each said first device is represented by a human readable name or intuitive name or symbol.

5. The method according to claim 1, further comprising:
performing actions of establishing a wireless connection in the background and not normally visible to a user.

6. The method according to claim 1, further comprising:
an alternative action of retrieving a radio address or a human readable name or intuitive name or symbol for the selected said first device from a copy of a list of available said first devices in a memory storage of the portable computing device.

7. The method according to claim 6, further comprising:
retrieving a copy of the list of available said first devices via a node of a LAN or WLAN and the copy in the computing device.

8. The method according to claim 6, further comprising:
retrieving the copy of the list of available said first devices from a portable memory storage member connected to the portable computing device comprising any from the list of: removable memory storage card, flash memory, removable hard drive, removable medium, CD, DVD, optical device.

9. The method according to claim 1, further comprising:
carrying out a wireless search to find new said first devices and adding other said first devices to the list of said first devices by the second computer program application on command or activation by a user.

10. The method according to claim 9, further comprising:
the user entering and storing by the second application a user-friendly name or symbol for a new said first device found during the wireless search.

11. The method according to claim 9, further comprising:
automatically receiving names of new said first devices during a wireless search and storing them, together with a radio address, in a list of said first devices.

12. The method according to claim 1, further comprising:
carrying out the wireless search to find new said first devices, or to connect to a device on command or activation by a user activating a graphic button or physical input member.

13. The method according to claim 1, further comprising:
sending a wireless data signal from the portable computing device to the selected said first device to establish a wireless connection.

14. The method according to claim 13, further comprising:
sending a wireless communication from the first computer program application to the selected said first device.

15. The method according to claim 14, further comprising:
performing a task in said first computer program application, and sending a message from the first computer program application to the selected said first device by the wireless connection established by the second computer program application.

16. The method according to claim 1, further comprising: calling the method or service of said first computer program application by an API of said first computer program application.

17. The method according to claim 1, further comprising: first detecting by the second computer program application a request from the first computer program application for a method or service associated with said first device, and then displaying of the list of said first devices provided by the second computer program application.

18. The method according to claim 1, further comprising: receiving at the radio communication member of the portable computing device a wireless inquiry signal, detecting receipt of the wireless inquiry signal, and then displaying by the second computer program application the list of said first devices.

19. The method according to claim 1, further comprising: removing the display of list of said first devices provided by the second computer program application after a time delay following a request for access to said first device.

20. The method according to claim 1, further comprising: a user starting the second computer program application so as to operate the second computer program application a selection or command or other action or button-press by the user.

21. The method according to claim 1, further comprising: applying a filter to the list of said first devices and presenting a filtered selection to a user.

22. The method according to claim 1, further comprising: applying the filter to the list of said first devices including a factor or variable or parameter from any of the list of: user log-in, user job, location, device type, device condition.

23. The method according to claim 1, further comprising: activating the graphic display member displayed by the HMI by any graphical input member.

24. The method according to claim 23, further comprising: providing information from the list of user-friendly names or symbols to a display member and/or process of said first computer program application so that the device list is visually presented to a user as an element of said first computer program application.

25. The method according to claim 1, further comprising: activating the graphic display member displayed by the HMI by a physical input member.

26. The method according to claim 1, further comprising: providing information from the list of user-friendly names or symbols to a display member and/or process of in a computer program that comprises functions of both the first computer program application and the second computer program application in one computer program application.

27. A non-transitory computer program product, comprising:
a computer-readable medium; and
computer program instructions recorded on the computer-readable medium executable by a processor for performing a method comprising
displaying a user-friendly name for a first said device dependent on identity information in a list of said first devices in a graphic display member on a GUI display of a said portable computing device,
receiving a signal for selection of said first device from the list of said first devices,
activating the user-friendly name or symbol of said first device so as to cause a second computer program application to call a method or service of said first computer program application in order to provide the method or service of the first computer program application or publish a port, or other access channel, for the established wireless connection;
returning or publishing a port number or other channel identifier to the first computer program application;
causing the radio communication member of the portable computing device to generate a wireless signal to establish a wireless connection with the selected first device; and
sending messages or retrieve data wirelessly between the first computer program application and the selected first device.

28. The non-statutory computer program product according to claim 27, wherein the computer program instructions are further for executing the computer program instructions locally on a portable computing device.

29. The non-statutory computer program product according to claim 28, wherein the computer program instructions are further for
establishing a wireless connection between the portable computing device and a selected first device, wherein the establishment is carried out such that the operation of retrieving a radio address of the selected first device and opening a connection with the selected first device is not normally visible to a user.

30. The non-statutory computer program product according to claim 27, wherein the computer program instructions operate in the background.

31. The non-statutory computer program product according to claim 27, wherein the computer program instructions are further for executing the computer program instructions locally on a portable computing device in cooperation with a server process on another computing machine.

32. The non-statutory computer program product according to claim 27, wherein the computer program instructions are embedded in a hardware component of a portable computing device.

* * * * *